(12) United States Patent
Lee

(10) Patent No.: US 11,655,847 B2
(45) Date of Patent: May 23, 2023

(54) AIR FOIL JOURNAL BEARING

(71) Applicant: Hyundai Wia Corporation, Gyeongsangnam-do (KR)

(72) Inventor: Dong Jun Lee, Gyeonggi-do (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 0 days.

(21) Appl. No.: 17/538,527

(22) Filed: Nov. 30, 2021

(65) Prior Publication Data
US 2022/0205477 A1 Jun. 30, 2022

(30) Foreign Application Priority Data
Dec. 29, 2020 (KR) .......................... 10-2020-0186331

(51) Int. Cl.
*F16C 17/02* (2006.01)

(52) U.S. Cl.
CPC .................................. *F16C 17/024* (2013.01)

(58) Field of Classification Search
CPC ............................... F16C 17/024; F16C 27/02
See application file for complete search history.

(56) References Cited

U.S. PATENT DOCUMENTS

| | | | | |
|---|---|---|---|---|
| 3,097,895 A | * | 7/1963 | Matt | F16C 27/04 384/535 |
| 4,196,945 A | | 4/1980 | Miller, Jr. | |
| 4,865,466 A | * | 9/1989 | Jones | F16C 17/024 248/580 |
| 6,505,837 B1 | * | 1/2003 | Heshmat | F16C 17/024 277/411 |
| 6,893,733 B2 | * | 5/2005 | Obeshaw | B62D 21/00 428/116 |
| 10,215,224 B1 | | 2/2019 | Lee et al. | |
| 2005/0163407 A1 | * | 7/2005 | Kang | F16C 43/02 384/106 |
| 2005/0185865 A1 | * | 8/2005 | Agrawal | F16C 17/024 384/106 |

FOREIGN PATENT DOCUMENTS

| | | | |
|---|---|---|---|
| CN | 109915477 A | * | 6/2019 |
| JP | 60-175914 | | 11/1985 |
| JP | S60175914 U | * | 11/1985 |

(Continued)

OTHER PUBLICATIONS

Machine Translation of JP-S60175914-U (Year: 1985).*

*Primary Examiner* — Alan B Waits
(74) *Attorney, Agent, or Firm* — Fox Rothschild LLP

(57) ABSTRACT

An air foil journal bearing can entirely restrain movement of a buffer member, which is provided inside a bearing housing in a direction of a shaft of the bearing. The air foil journal bearing includes: the bearing housing having a hollow part into which the shaft is inserted, wherein a first stopping groove is formed at an inner circumferential surface of the hollow part and a second stopping groove is formed at the inner circumferential surface of the hollow part along at least a part of an entire circumference of the hollow part; a top foil provided in the hollow part and configured to have a shape covering the shaft; and the buffer member provided between the hollow part and the top foil and elastically supporting the top foil.

9 Claims, 9 Drawing Sheets

(56) References Cited

FOREIGN PATENT DOCUMENTS

| | | |
|---|---|---|
| JP | 2002-061645 A | 2/2002 |
| JP | 2006-105380 A | 4/2006 |
| JP | 2010-529390 A | 8/2010 |
| KR | 2019-0021540 A | 3/2019 |
| WO | 2020/098866 A1 | 5/2020 |

* cited by examiner

AIR FOIL JOURNAL BEARING

CROSS REFERENCE TO RELATED APPLICATION

The present application claims under 35 U.S.C. § 119(a) the benefit of Korean Patent Application No. 10-2020-0186331, filed Dec. 29, 2020, the entire contents of which are incorporated by reference herein.

BACKGROUND

(a) Technical Field

The present disclosure relates to an air foil journal bearing which can entirely restrain movement of a buffer member, which is provided inside a bearing housing, in a direction of a shaft of the bearing.

(b) Description of the Related Art

Generally, an air foil journal bearing is a bearing which supports a radial load of a shaft and supports the load by creating pressure by introducing air to a gap between the shaft and a foil as the shaft rotates at high speed.

In the air foil journal bearing, a bump foil is installed at an inner surface of a hollow part of a bearing housing, and a top foil is provided between an inner surface of the bump foil and an outer surface of the shaft.

In addition, a stopper is installed to prevent removal of the bump foil to outside of the bearing housing in a direction of the shaft during rotation of the shaft.

Accordingly, when the shaft rotates at high speed, a pressure of an air gap between the shaft and the bearing increases and a force supporting the shaft is improved, so the bearing having minimal friction can be realized.

However, the stopper supports only a portion of the bump foil in the direction of the shaft, so a remaining portion of the bump foil which is not supported by the stopper may be removed to the outside of the bearing housing in the direction of the shaft. Accordingly, positional stability of the bearing decreases.

Matters described above as a background art are only for improving the understanding of the background of the present disclosure, and should not be accepted as acknowledging that the matters correspond to the prior art known to those skilled in the art.

SUMMARY

Accordingly, the present disclosure proposes an air foil journal bearing which can entirely restrain movement of a buffer member, which is provided inside a bearing housing, in a direction of a shaft of the bearing.

In order to achieve the above objective, according to one aspect of the present disclosure, there is provided an air foil journal bearing including: a bearing housing having a hollow part into which a shaft is inserted, wherein a first stopping groove is formed at an inner circumferential surface of the hollow part and a second stopping groove is formed at the inner circumferential surface of the hollow part along at least a part of an entire circumference of the hollow part; a top foil provided in the hollow part and configured to have a shape covering the shaft, wherein a first stopper is formed on an outer circumferential surface of the top foil such that the first stopper is fitted into the first stopping groove, and a second stopper is formed on the outer circumferential surface of the top foil along at least a part of an entire circumference of the top foil such that the second stopper is fitted into the second stopping groove; and a buffer member provided between the hollow part and the top foil and elastically supporting the top foil.

The second stopper may be formed on each of opposite edges of an axial direction of the top foil; the second stopping groove may be formed at a center portion of the inner circumferential surface of the hollow part; and the buffer member may be provided between the opposite second stoppers.

The first stopper may be formed on the outer circumferential surface of the top foil along a direction of the shaft, and the first stopping groove may be formed at the inner circumferential surface of the hollow part along the direction of the shaft such that the first stopping groove intersects and overlaps the second stopping groove.

The second stopper may be formed on the outer circumferential surface of the top foil along the circumferential direction of the top foil, and the second stopping groove may be formed at the inner circumferential surface of the hollow part along the circumferential direction of the hollow part.

The first stopper may connect with the second stopper along the circumferential direction of the top foil and may be formed by protruding more than the second stopper in an outward radial direction of the top foil, and the first stopping groove may connect with the second stopping groove along the circumferential direction of the hollow part and may be formed by being recessed more than the second stopping groove in an outward radial direction of the hollow part.

Each of the first stopper and the second stopper may be configured to have a shape in which a portion of the top foil is folded in an outward radial direction of the top foil.

A radial interval between the second stopper and the second stopping groove may be formed to be larger than a maximum elastic displacement of the buffer member in a radial direction of the buffer member.

The buffer member may be a bump foil formed in a corrugated form along a circumferential direction of the buffer member such that the bump foil has a shape covering the top foil.

The buffer member may be provided in a direction of the shaft by being formed in a shape of a pipe and may be configured as multiple elastic pipes provided along a circumferential direction of the buffer member such that the multiple elastic pipes have a shape covering the top foil.

According to the present disclosure, through the above problem solving means, the second stopper is formed along the entire edge of the top foil, whereby the movement of the buffer member in the direction of the shaft is entirely restrained such that the removal of the buffer member in the direction of the shaft is fundamentally prevented, thereby improving the positional stability of the bearing.

Furthermore, even when the amount of the deformation of the buffer member is maximum, the second stopper of the top foil is not in contact with the inner surface of the second stopping groove, thereby stably maintaining the function of the buffer member.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
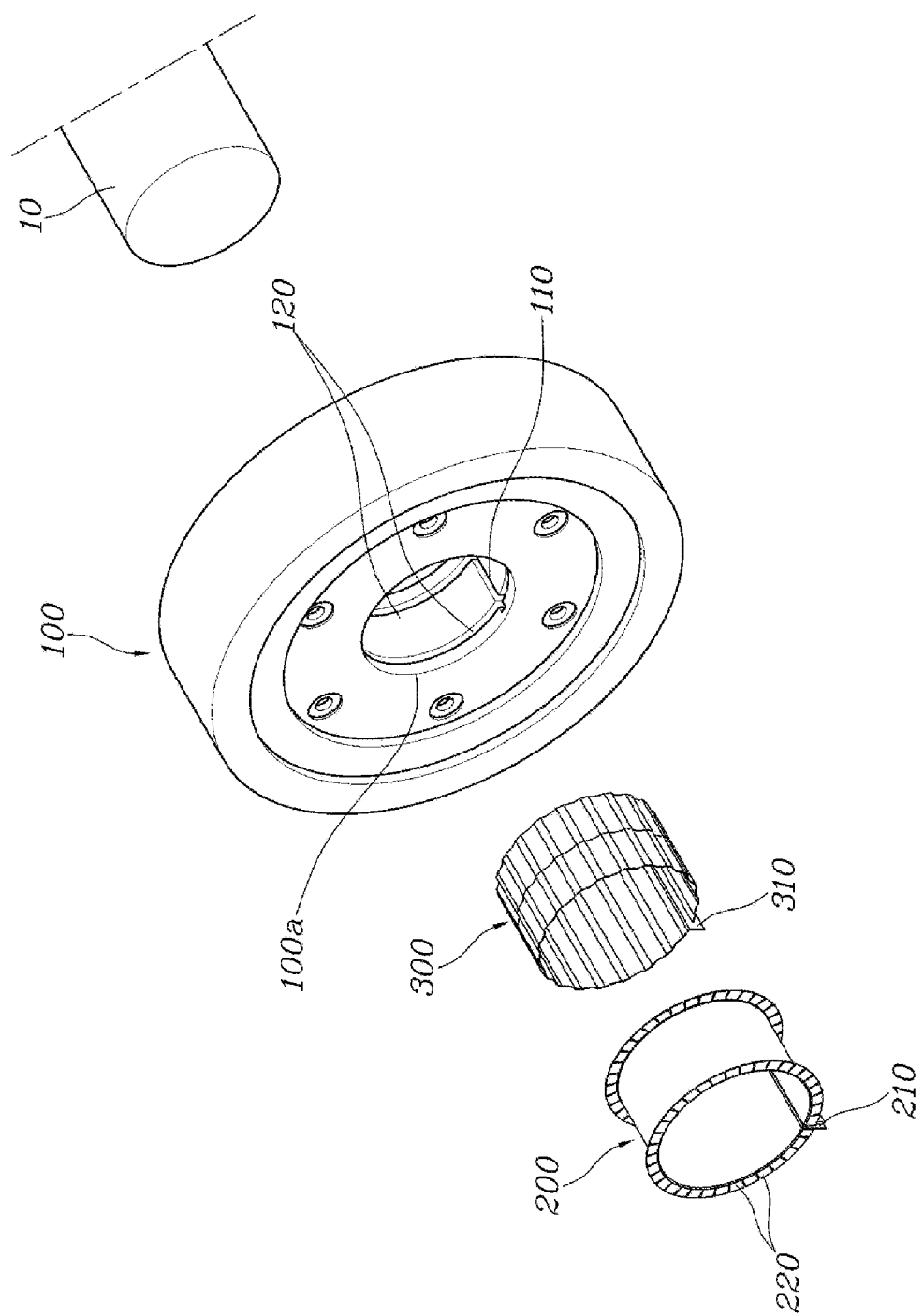
FIG. 1 is a perspective view illustrating a top foil and a buffer member separated from each other in an air foil journal bearing according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Specific structural and functional descriptions of the embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to the embodiments of the present disclosure, a specific example of which is illustrated in the accompanying drawings and described below, since the embodiments of the present disclosure can be variously modified in many different forms. While the present disclosure will be described in conjunction with the exemplary embodiments thereof, it is to be understood that the present description is not intended to limit the present disclosure to the exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms first, second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is only for the purpose of describing particular embodiments and is not intended to be limiting the embodiments of the present disclosure thereto. As used herein, the singular forms "a", "an", and "the" are intended to include the plural forms as well, unless the context clearly indicates otherwise. As used herein, the terms "and/or" and "at least one of" include any and all combinations of one or more of the associated listed items.

It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating a top foil and a buffer member separated from each other in an air foil journal bearing according to the present disclosure.

Referring to FIG. 1, the air foil journal bearing of the present disclosure includes: a bearing housing 100 having a hollow part 100a into which a shaft 10 is inserted, wherein a first stopping groove 110 is formed at an inner circumferential surface of the hollow part 100a and a second stopping groove 120 is formed at the inner circumferential surface of the hollow part 100a along at least a part of an entire circumference of the hollow part 100a; a top foil 200 provided in the hollow part 100a and to have a shape covering the shaft 10, wherein a first stopper 210 is formed on an outer circumferential surface of the top foil 200 such that the first stopper is fitted into the first stopping groove 110, and a second stopper 220 is formed on the outer circumferential surface of the top foil 200 along at least a part of an entire circumference of the top foil 200 such that the second stopper 220 is fitted into the second stopping groove 120; and a buffer member provided between the hollow part 100a and the top foil 200 and elastically supporting the top foil 200. For example, the hollow part 100a having a circular shape is formed at a center of the bearing housing 100 in a direction of the shaft 10, and the shaft 10 is inserted into the hollow part 100a. In addition, the top foil 200 is inserted into the hollow part 100a such that the top foil 200 has a shape covering the shaft 10, and the buffer member is inserted into the hollow part 100a such that the buffer member has a shape covering the top foil 200.

Furthermore, the first stopping groove 110 is formed at the inner circumferential surface of the hollow part 100a such that the first stopping groove has a shape of a rectangular slot, and the first stopper 210 is formed on the outer circumferential surface of the top foil 200 by protruding in an outward radial direction of the top foil 200 such that the first stopper 210 corresponds to the first stopping groove 110, so the first stopper 210 is fitted into the first stopping groove 110.

In this case, the opposite ends of the first stopping groove 110 located at longitudinal end portions of the first stopping groove 110 are configured to have shapes blocked by the bearing housing 100, whereby the first stopper 210 is maintained to be fitted into the first stopping groove 110. Accordingly, during the rotation of the shaft 10, the removal of the top foil 200 to the outside of the hollow part 100a is prevented.

Particularly, the second stopping groove 120 is formed in the shape of a slot that completely surrounds the inner circumferential surface of the hollow part 100a in a circumferential direction of the hollow part 100a, and the second stopper 220 is formed on the outer circumferential surface of the top foil 200 by protruding therefrom in the outward radial direction of the top foil 200 such that the second stopper 220 corresponds to the second stopping groove 120. Accordingly, the second stopper 220 is fitted into the second stopping groove 120.

That is, the second stopper 220 is formed along the entire edge of the top foil 200 such that the movement of the buffer member in the direction of the shaft 10 is entirely restrained, so the removal of the buffer member in the direction of the shaft 10 is fundamentally prevented, thereby improving the positional stability of the bearing.

In addition, the second stopper 220 may be formed on each of opposite edges of the top foil 200 in the radial direction of the top foil 200; the second stopping groove 120 may be formed at a center portion of the inner circumferential surface of the hollow part 100a; and the buffer member may be provided between the opposite second stoppers 220.

For example, the second stopping groove 120 is formed at each of the opposite side portions of the inner circumferential surface of the hollow part 100a relative to the direction of the shaft 10, so the top foil 200 is located at the center portion of the inner circumferential surface of the hollow part 100a.

Furthermore, the second stopping groove 120 is formed at the center portion of the inner circumferential surface of the bearing housing 100 and thus is configured to have a shape blocked in a width direction of the bearing housing 100.

Accordingly, during the rotation of the shaft 10, the removal of the buffer member in the direction of the shaft is prevented by the second stopper 220, and the removal of the top foil 200 in the direction of the shaft inserted into the hollow part 100a is more securely prevented.

Figure 2:
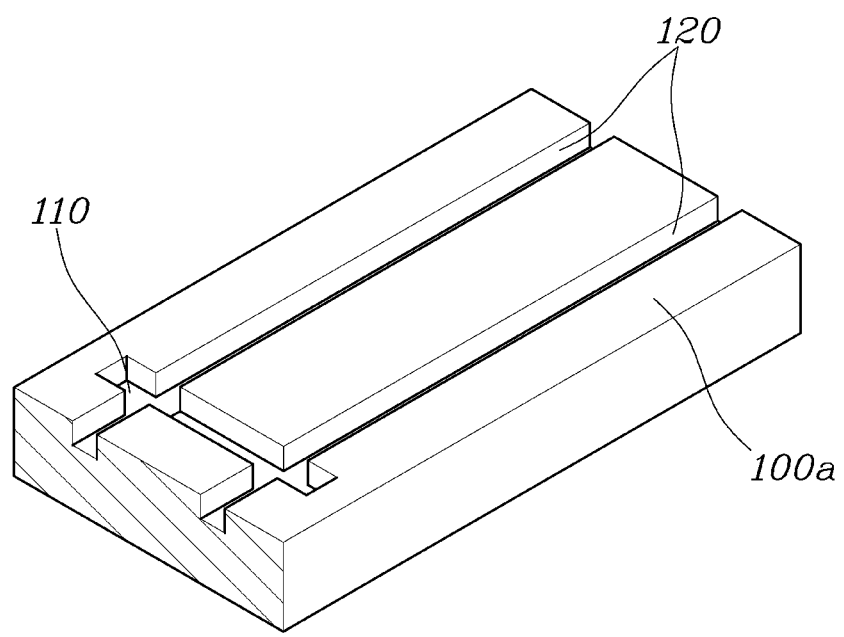
FIG. 2 is a view illustrating the unfolded shape of a hollow part of a bearing housing applied to the coupling structure of the bearing housing and the top foil according to a first embodiment of the present disclosure.
Figure 3:
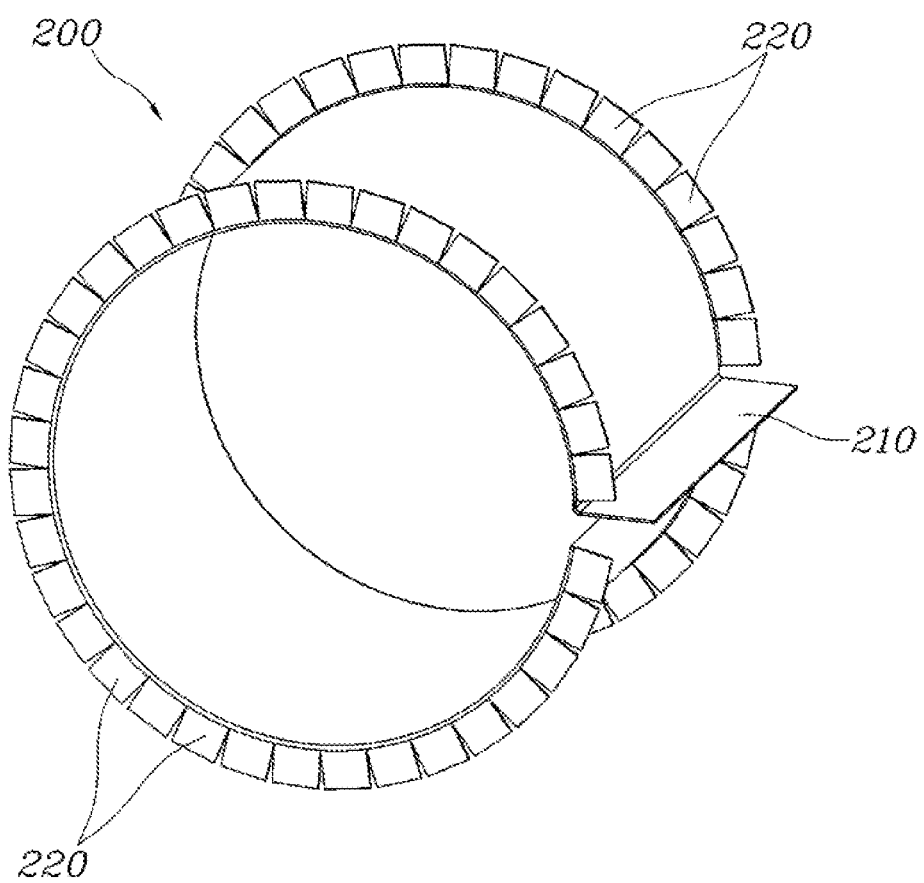
FIG. 3 is a view illustrating the top foil coupled to the hollow part of the bearing housing of FIG. 2.

FIG. 2 is a view illustrating the unfolded shape of the hollow part 100a of the bearing housing 100 applied to the coupling structure of the bearing housing 100 and the top foil 200; FIG. 3 is a view illustrating the top foil 200 coupled to the hollow part 100a of the bearing housing 100 of FIG. 2; and FIG. 4 is a view illustrating a state in which the top foil 200 is coupled to the bearing housing 100 of the present disclosure through the coupling structure according to the first embodiment.

Figure 4:
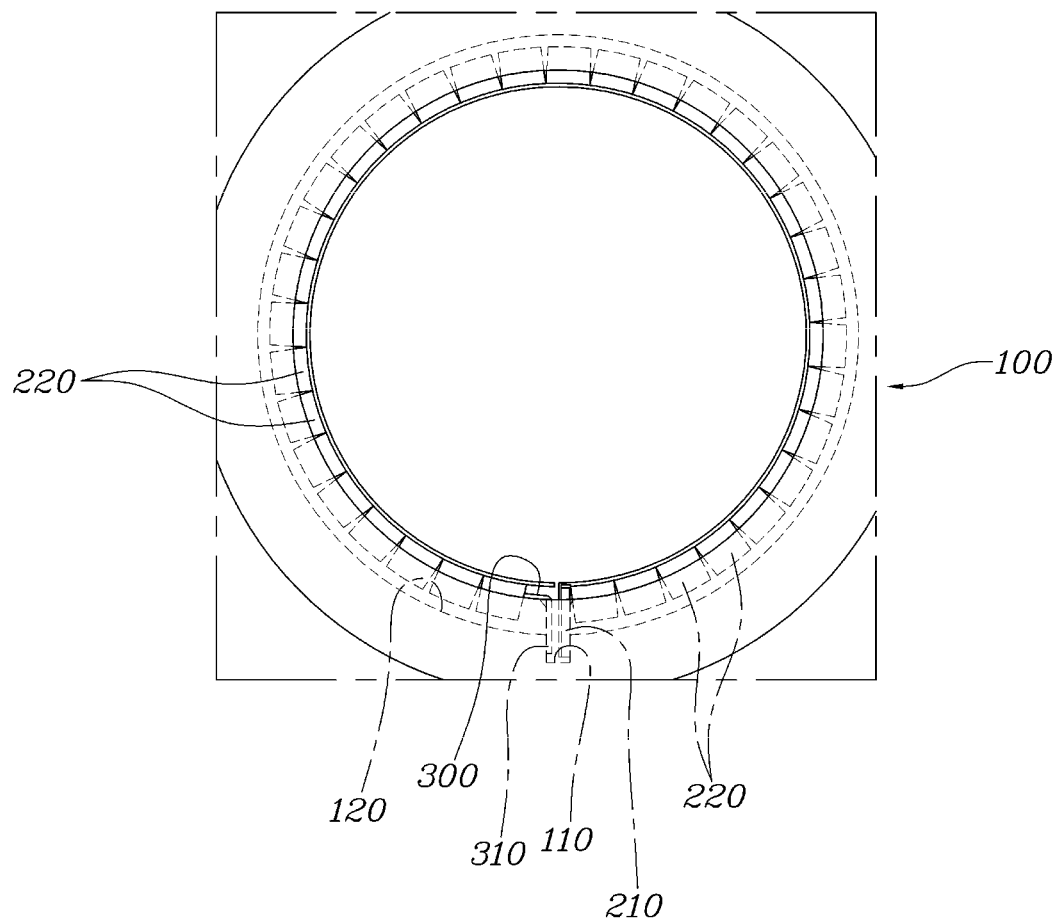
FIG. 4 is a view illustrating a state in which the top foil is coupled to the bearing housing of the present disclosure through the coupling structure according to the first embodiment.

Referring to FIGS. 2-4, the first stopper 210 is formed on the outer circumferential surface of the top foil 200 along the direction of the shaft, and the first stopping groove 110 is formed at the inner circumferential surface of the hollow part 100a along the direction of the shaft 10 such that the first stopping groove 110 intersects and overlaps the second stopping groove 120.

For example, the second stopping groove 120 is formed at each of the opposite sides of the inner circumferential surface of the hollow part 100a along the entire circumference of the hollow part 100a, and the first stopping groove 110 is formed between the opposite second stopping grooves 120 and at the inner circumferential surface of the hollow part 100a along the direction of the shaft 10, so the first stopping groove 110 and the second stopping groove 120 connect with each other.

In addition, the top foil 200 is configured to have a shape in which a rectangular plate is rolled into a circular shape and includes: the first stopper 210 formed by protruding from an end of the top foil 200 in the radial direction of the top foil 200 along the direction of the shaft, and the second stopper 220 connecting with the first stopper 210 and formed by protruding from the entirety of each of the opposite edges of the top foil 200 in the radial direction of the top foil 200 along the circumferential direction of the top foil 200.

That is, the first stopper 210 of the top foil 200 formed in the direction of the shaft is fitted into the first stopping groove 110 formed in the hollow part 100a in the direction of the shaft such that the movement of the top foil 200 in the circumferential direction of the hollow part is restrained, and the second stopper 220 formed in the circumferential direction of the top foil 200 is fitted into the second stopping groove 120 formed in the circumferential direction of the hollow part 100a such that the movement of the top foil 200 in the direction of the shaft is restrained. Accordingly, the removal of the top foil 200 from the bearing housing 100 can be more securely prevented.

Figure 5:
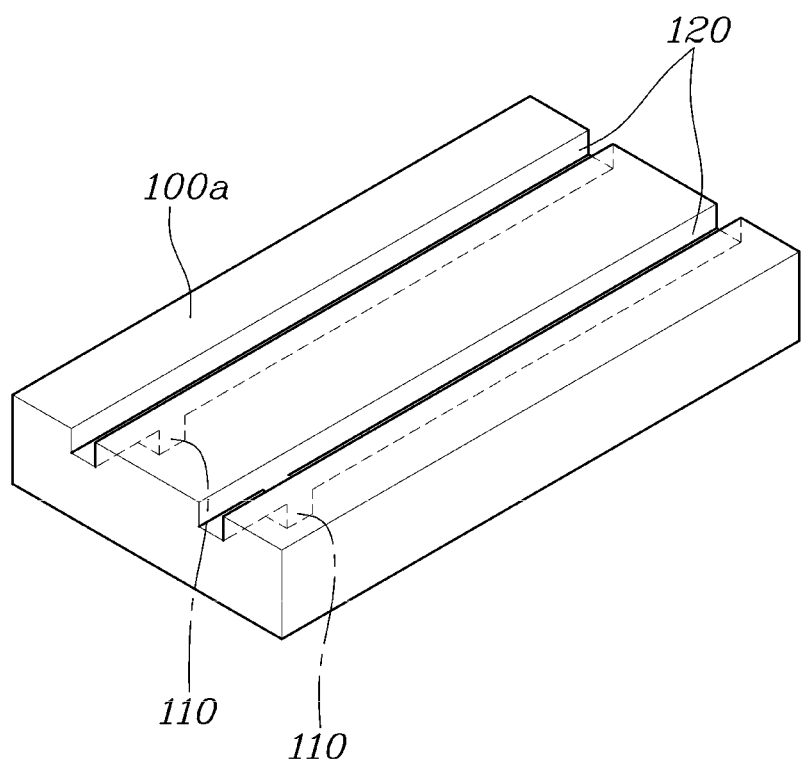
FIG. 5 is a view illustrating the unfolded shape of a hollow part of a bearing housing applied to the coupling structure of the bearing housing and a top foil of the present disclosure according to a second embodiment of the present disclosure the bearing housing the hollow part.
Figure 6:
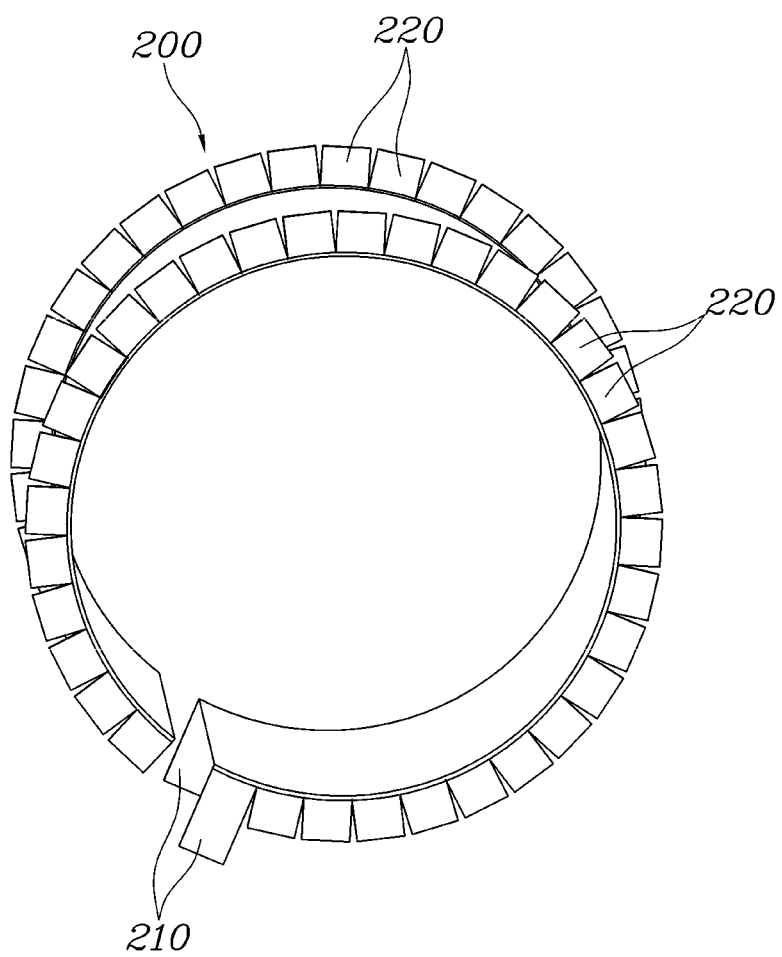
FIG. 6 is a view illustrating the top foil coupled to the hollow part of the bearing housing of FIG. 5.

Meanwhile, FIG. 5 is a view illustrating the unfolded shape of a hollow part 100a of a bearing housing 100 applied to the coupling structure of the bearing housing 100 and top foil 200 of the present disclosure according to a second embodiment of the present disclosure the bearing housing the hollow part; FIG. 6 is a view illustrating the top foil 200 coupled to the hollow part 100a of the bearing housing 100 of FIG. 5; and FIG. 7 is a view illustrating a state in which the top foil 200 is coupled to the bearing housing 100 of the present disclosure through the coupling structure according to the second embodiment.

Figure 7:
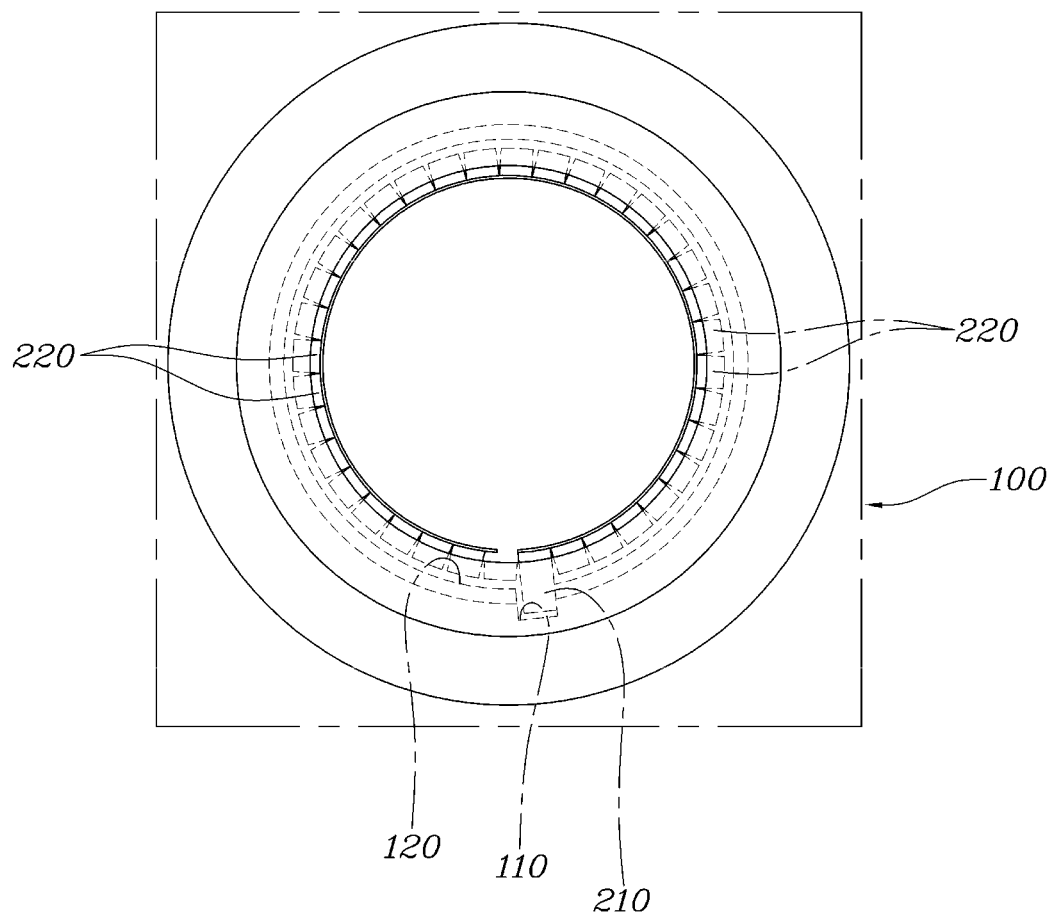
FIG. 7 is a view illustrating a state in which the top foil is coupled to the bearing housing of the present disclosure through the coupling structure according to the second embodiment.

Referring to FIGS. 5-7, the first stopper 210 is formed on the outer circumferential surface of the top foil 200 along the circumferential direction of the top foil 200, and the first stopping groove 110 is formed at the inner circumferential surface of the hollow part 100a along the circumferential direction of the hollow part 100a.

Specifically, the first stopper 210 may connect with the second stopper 220 along the circumferential direction of the top foil 200 and may be formed by protruding more than the second stopper 220 in the outward radial direction of the top foil 200, and the first stopping groove 110 may connect with the second stopping groove 120 along the circumferential direction of the hollow part and may be formed by being recessed more than the second stopping groove 120 in the outward radial direction of the hollow part.

For example, the second stopping groove 120 is formed at each of the opposite sides of the inner circumferential surface of the hollow part 100a along the entire circumference of the hollow part 100a, and the first stopping groove 110 is formed between the opposite second stopping grooves 120 by being recessed more deeply than the second stopping groove 120.

In addition, the top foil 200 is configured to have a shape in which a rectangular plate is rolled into a circular shape and includes: the first stopper 210 formed by protruding from each of the opposite edges the top foil 200 formed at an end of the top foil 200 in the radial direction of the top foil 200 along the circumferential direction of the top foil 200, and connecting with the first stopper 210 and the second stopper 220 formed by protruding from the entire edge of the top foil 200 in the radial direction of the top foil 200 along the circumferential direction of the top foil 200.

That is, the second stopper 220 of the top foil 200 formed in the circumferential direction of the top foil 200 is fitted into the second stopping groove 120 of the hollow part 100a formed in the circumferential direction of the hollow part 100a such that the movement of the top foil 200 in the direction of the shaft is restrained, and the first stopper 210 configured to be longer than the second stopper 220 is fitted into the first stopping groove 110 such that the movement of the top foil 200 in the circumferential direction of the top foil 200 is restrained. Accordingly, the movement of the top foil 200 in the circumferential direction can be prevented in the bearing housing 100 and the removal of the top foil 200 from the inside of the bearing housing 100 in the direction of the shaft can be prevented.

Furthermore, referring to FIGS. 3 and 6, each of the first stopper 210 and the second stopper 220 may be configured to have a shape in which a portion of the top foil 200 is folded in an outward radial direction of the top foil 200.

For example, the top foil 200 is formed in a plate shape before being assembled with the hollow part 100a. However, to assemble the top foil 200 with the hollow part 100a, the first stopper 210 and the second stopper 220 are folded in the outward radial directions of the top foil 200 so as to constitute the top foil 200.

Particularly, the second stopper 220 is formed along the circumferential direction of the top foil 200 in a radial form relative to the shaft. Accordingly, even if the buffer member is configured to have a shape having different parts separated from each other instead of an integrated plate shape, the removal of the buffer member in the direction of the shaft can be prevented.

Figure 8:
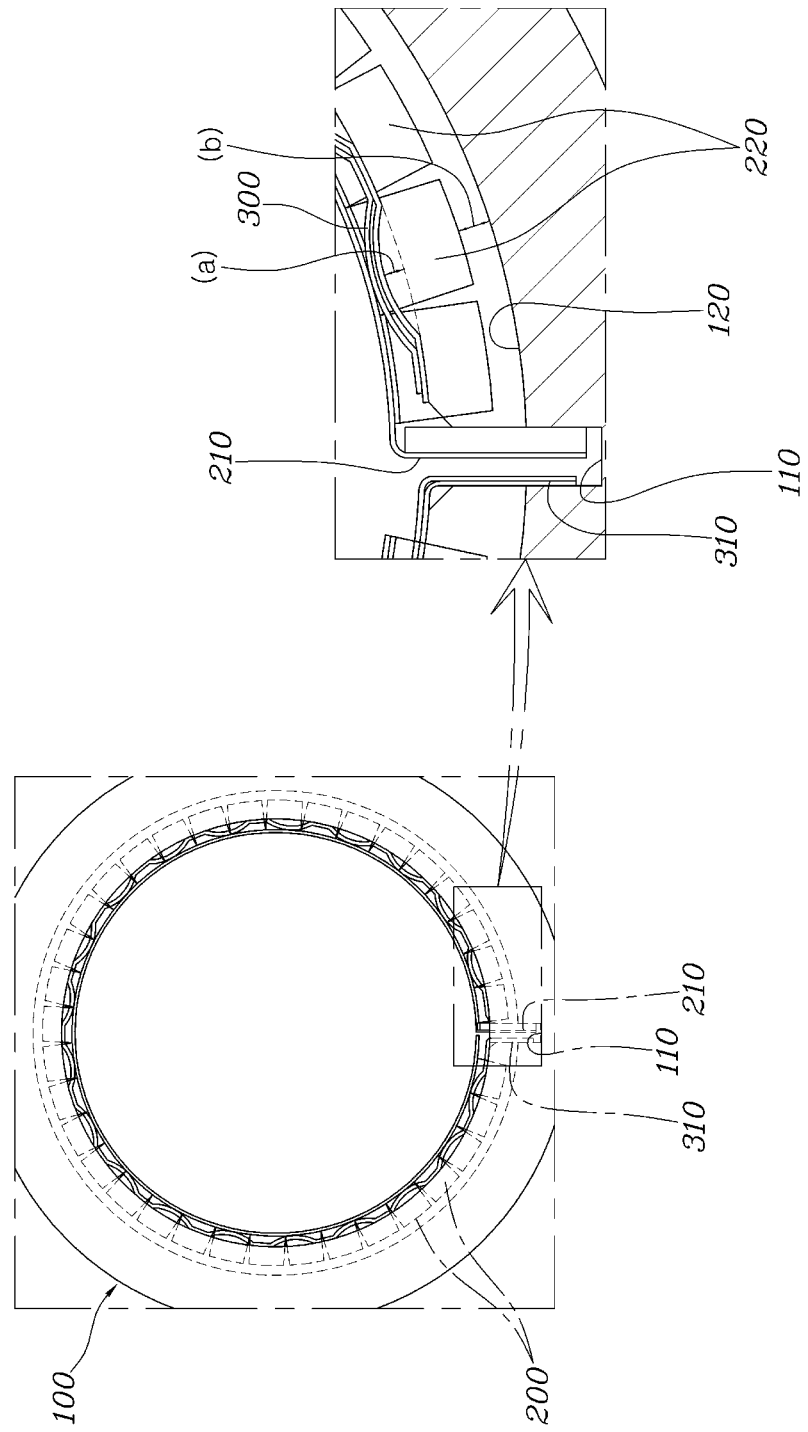
FIG. 8 is a view illustrating relation between an interval between a second stopper and a second stopping groove and the elastic displacement of the buffer member according to the present disclosure.

In addition, FIG. 8 is a view illustrating relation between an interval between the second stopper and the second stopping groove and the elastic displacement of the buffer member according to the present disclosure.

Referring to the drawing, a radial interval between the second stopper 220 and the second stopping groove 120 may be formed to be larger than a maximum elastic displacement of the buffer member in a radial direction of the buffer member.

That is, when mounting the top foil 200 and the buffer member inside the hollow part 100a, a radial interval b between the second stopper 220 and the second stopping groove 120 is formed to be longer than the maximum elastic displacement (a) of the buffer member in the radial direction of the buffer member. Accordingly, even when the amount of the deformation of the buffer member is maximum, the second stopper 220 of the top foil 200 is not in contact with the inner surface of the second stopping groove 120, thereby stably maintaining the function of the buffer member.

Meanwhile, referring to FIG. 1, the buffer member may be a bump foil 300 formed in a corrugated form along a circumferential direction of the buffer member such that the bump foil has a shape covering the top foil 200.

For example, the bump foil 300 is configured to have a shape in which a rectangular plate is rolled into a circular shape and is formed in a corrugated form along the circumferential direction of the bump foil such that the bump foil has an elastic function.

In addition, a bump stopper 310 is formed at an end of the bump foil 300 by protruding therefrom in the radial direction of the bump foil. The bump stopper 310 may be fitted into the first stopping groove 110 into which the first stopper 210 is fitted.

However, although the bump stopper 310 and the first stopper 210 protrude in the same radial directions, the protruding positions of the bump stopper 310 and the first stopper 210 may be opposite to each other. That is, when the first stopper 210 protrudes from an end of the top foil 200 clockwise, the bump stopper 310 may protrude from an end of the bump foil 300 counterclockwise, and the protruding bump stopper 310 may pass through the top foil 200 and may be fitted into the first stopping groove 110.

Figure 9:
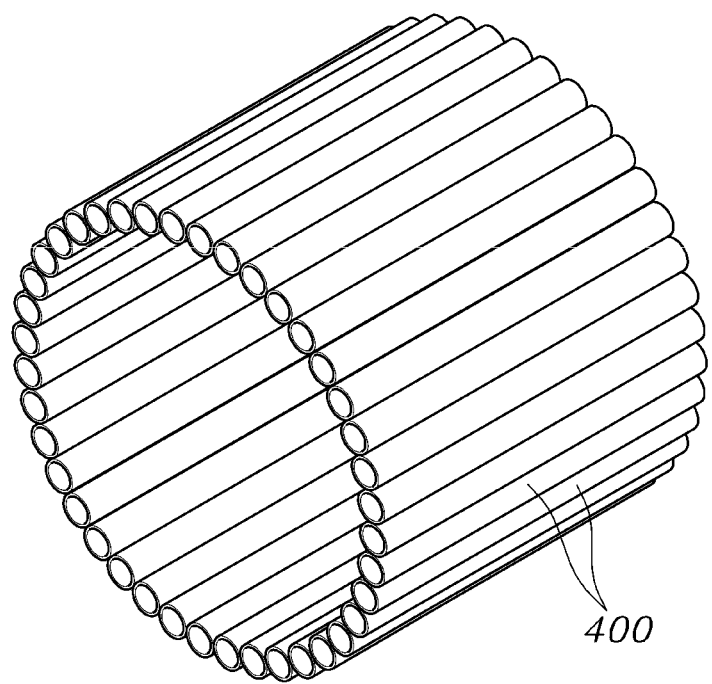
FIG. 9 is a view illustrating the structure of the buffer member applied as the shape of an elastic pipe according to the present disclosure.

In addition, FIG. 9 is a view illustrating the structure of the buffer member applied as the shape of an elastic pipe 400 according to the present disclosure.

Referring to the drawing, the buffer member is provided in the direction of the shaft by being formed in a shape of a pipe and may be configured as multiple elastic pipes 400 provided along the circumferential direction of the buffer member such that the multiple elastic pipes have a shape covering the top foil 200.

For example, the elastic pipe 400 may have a cylindrical shape and is formed to be long in the direction of the shaft and includes multiple elastic pipes provided between the outer circumferential surface of the top foil 200 and the inner circumferential surface of the hollow part 100*a* along the circumferential direction of the buffer member.

As described above, according to the present disclosure, the second stopper 220 is formed along the entire edge of the top foil 200 such that the movement of the buffer member in the direction of the shaft is entirely restrained, so the removal of the buffer member in the direction of the shaft is fundamentally prevented, thereby improving the positional stability of the bearing.

Furthermore, even when the amount of the deformation of the buffer member is maximum, the second stopper 220 of the top foil 200 is not in contact with the inner surface of the second stopping groove 120, thereby stably maintaining the function of the buffer member.

Meanwhile, although the exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. An air foil journal bearing, comprising:
   a bearing housing having a hollow part into which a shaft is inserted, wherein a first stopping groove is formed at an inner circumferential surface of the hollow part and a second stopping groove is formed at the inner circumferential surface of the hollow part along at least a part of the circumference of the hollow part;
   a top foil provided in the hollow part and configured to have a shape covering the shaft, wherein a first stopper is formed on an outer circumferential surface of the top foil such that the first stopper is fitted into the first stopping groove, and a second stopper is formed on the outer circumferential surface of the top foil along at least a part of an entire circumference of the top foil such that the second stopper is fitted into the second stopping groove; and
   a buffer member provided between the hollow part and the top foil and elastically supporting the top foil,
   wherein the first stopper connects with the second stopper along a circumferential direction of the top foil and is formed by protruding more than the second stopper in an outward radial direction of the top foil, and
   wherein the first stopping groove connects with the second stopping groove along a circumferential direction of the hollow part and is formed by being recessed more than the second stopping groove in an outward radial direction of the hollow part.

2. The air foil journal bearing of claim 1, wherein the second stopper is formed on each of opposite edges of the top foil in a radial direction of the top foil;
   the second stopping groove is formed at each of opposite side portions of the inner circumferential surface of the hollow part relative to a direction of the shaft; and
   the buffer member is provided between the opposite second stoppers.

3. The air foil journal bearing of claim 1, wherein the first stopper is formed on the outer circumferential surface of the top foil along a direction of the shaft, and the first stopping groove is formed at the inner circumferential surface of the hollow part along the direction of the shaft such that the first stopping groove intersects and overlaps the second stopping groove.

4. The air foil journal bearing of claim 3, wherein the first stopper connects with the second stopper along the circumferential direction of the top foil and is formed by protruding more than the second stopper in an outward radial direction of the top foil, and
   the first stopping groove connects with the second stopping groove along the circumferential direction of the hollow part and is formed by being recessed more than the second stopping groove in an outward radial direction of the hollow part.

5. The air foil journal bearing of claim 1, wherein the second stopper is formed on the outer circumferential surface of the top foil along the circumferential direction of the top foil, and
   the second stopping groove is formed at the inner circumferential surface of the hollow part along the circumferential direction of the hollow part.

6. The air foil journal bearing of claim 1, wherein each of the first stopper and the second stopper is configured to have a shape in which a portion of the top foil is folded in an outward radial direction of the top foil.

7. The air foil journal bearing of claim 1, wherein a radial interval between the second stopper and the second stopping groove is formed to be larger than a maximum elastic displacement of the buffer member in a radial direction of the buffer member.

8. The air foil journal bearing of claim 1, wherein the buffer member is a bump foil formed in a corrugated form along a circumferential direction of the buffer member such that the bump foil has a shape covering the top foil.

9. The air foil journal bearing of claim 1, wherein the buffer member is provided in a direction of the shaft by being formed in a shape of a pipe and is configured as multiple elastic pipes provided along a circumferential direction of the buffer member such that the multiple elastic pipes have a shape covering the top foil.

* * * * *